April 8, 1952     G. J. KUKA     2,591,834
RETRACTABLE ROCKET LAUNCHER
Filed July 21, 1948     3 Sheets-Sheet 1
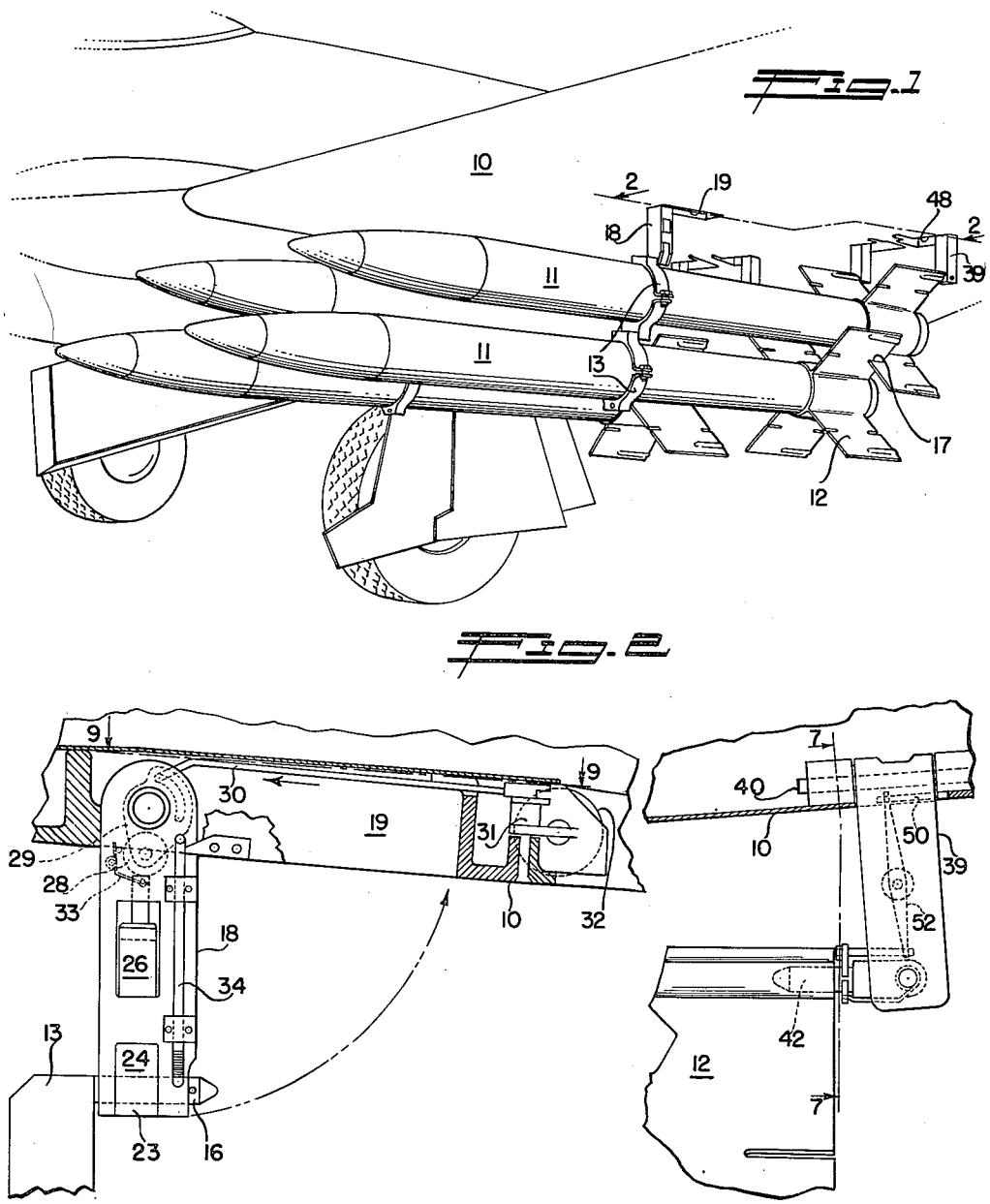
*INVENTOR.*
GEORGE J. KUKA
BY
*George Sullivan*
Agent

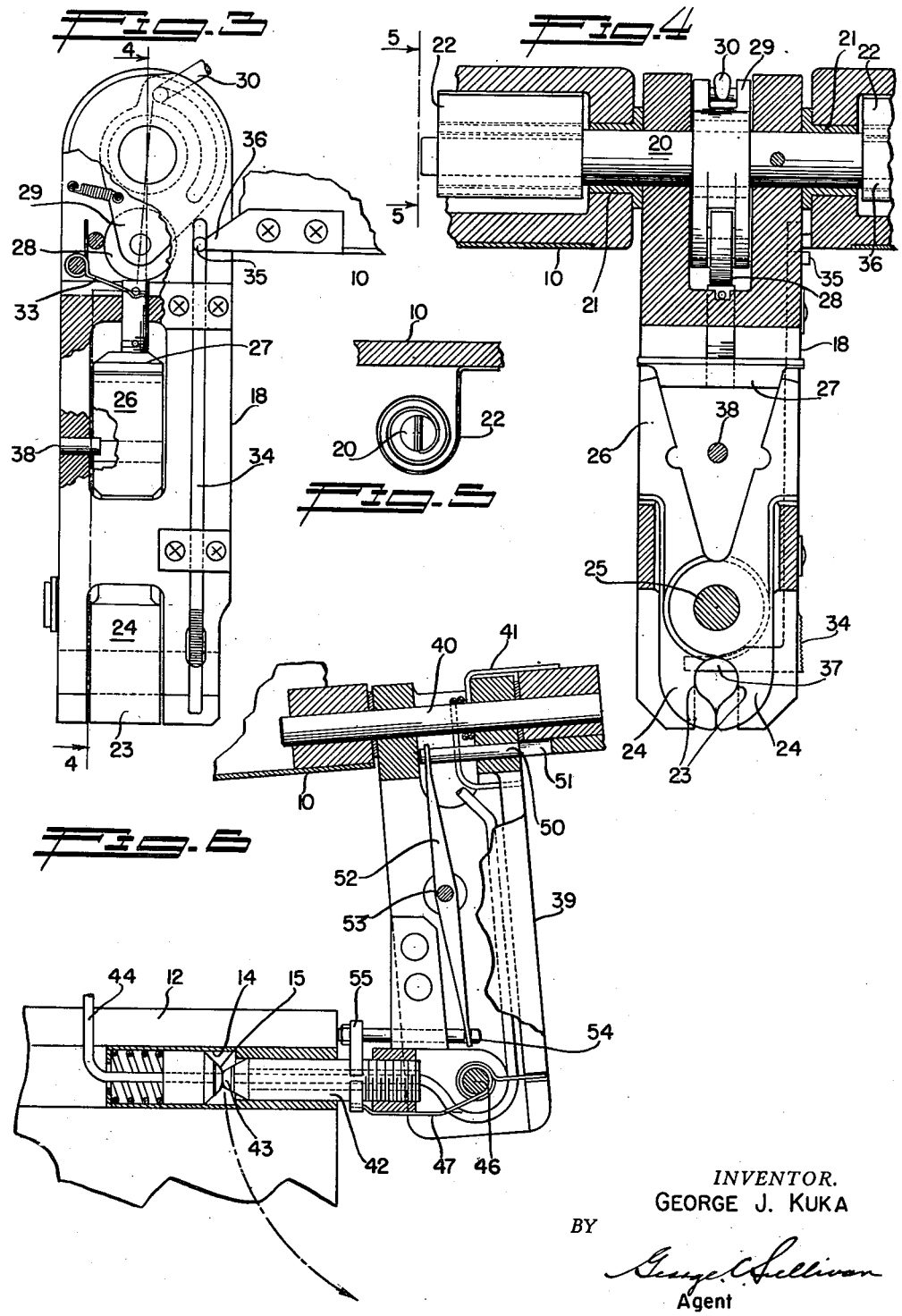

April 8, 1952 G. J. KUKA 2,591,834
RETRACTABLE ROCKET LAUNCHER
Filed July 21, 1948 3 Sheets-Sheet 3
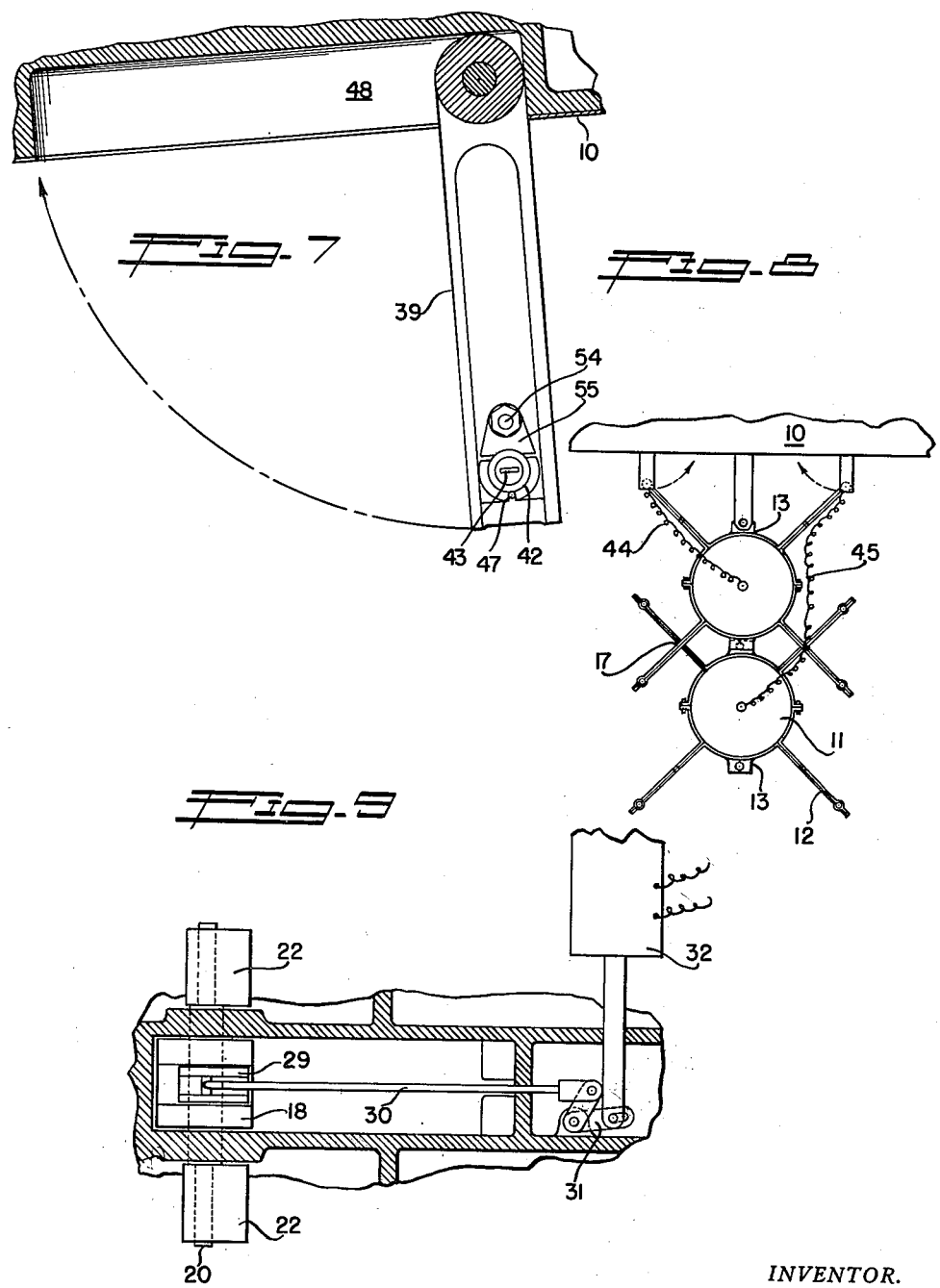
INVENTOR.
GEORGE J. KUKA
BY
*George C. Sullivan*
Agent Patented Apr. 8, 1952

2,591,834

UNITED STATES PATENT OFFICE 2,591,834

RETRACTABLE ROCKET LAUNCHER

George J. Kuka, Burbank, Calif., assignor to Lockheed Aircraft Corporation, Burbank, Calif.

Application July 21, 1948, Serial No. 39,943

9 Claims. (Cl. 89—1.7)

This invention relates to retractable mounting means for supporting rockets or the like beneath airplane wings. Provision is made for either jettisoning or firing of self powered rockets at the will of the pilot or a crew member of the airplane, and to support the rocket or the like without the need of the sway braces.

It has heretofore been proposed to mount rockets, fuel tanks, bombs, and the like, externally of the airplane, and rockets have been mounted singly or in clusters beneath airplane wings, such clusters having fixed brackets resembling inverted Christmas trees. Jettisoning of such disposable loads has heretofore been a serious problem of such mountings since a straight drop, as distinguished from firing, sometimes results in damage to the airplane itself because of aerodynamic forces which tend to cause such streamlined containers to tumble at the moment of release, striking parts of the airplane. Sway bracing has also been a problem because of side forces imposed on the mountings.

The present invention provides a three point mounting for rockets and the like, eliminating the need of sway bracing, and for safe jettisoning independent of the normal firing procedure for self-powered missiles such as rockets, and for retraction of the mounting posts flush with the surface of the carrier upon release or firing of the rocket. It also provides temporary downlocks to hold the mounting posts in position for the mounting of a rocket or the like thereon, and provides for the automatic release of such downlocks when the rocket is mounted, to permit such retraction.

Other and further objects and advantages of this invention will become apparent as the description proceeds so that my invention is not limited to the illustrated embodiment chosen for description herein.

On the drawings:

Figure 1 is a fragmentary perspective view showing the installation of the rocket launcher of this invention in relation to the wing of a fighter type airplane;

Figure 2 is an enlarged fragmentary detail, on the line 2—2 of Figure 1, showing the extended front and rear mounting posts in side elevation;

Figure 3 is an enlarged side view, partly broken away, of the front post, showing the release or rocket jettisoning mechanism;

Figure 4 is a view taken on the line 4—4 of Figure 3, equivalent to a front view thereof;

Figure 5 is a fragmentary detail on the line 5—5 of Figure 4 showing the retraction spring;

Figure 6 is a side view, partly broken away, of one of the rear posts in engagement with the outer corner of the rocket fin, the electrical rocket firing circuit being carried through the engagement means;

Figure 7 is a front view of one rear post in its extended position;

Figure 8 is a rear view of the mounting posts with rockets supported therefrom, schematically including the separate firing circuits for the super-imposed rockets; and Figure 9 is a fragmentary top plan detail of the jettisoning solenoid and linkage for the front post.

The embodiment chosen to illustrate this invention relates to mounting rocket propelled missiles under airplane wings 10, the rockets 11 themselves being standard Air Force equipment, known as HVAR, and having tail fins 12 and front bands 13 clamped thereto. The tail fins 12 have sockets 14 at their tips to engage a pair of rear supports, which rockets have electric connections 15 for igniting or firing the rockets; and the front bands 13 have rearwardly extending pins 16 engageable with a front support. In the event the rocket is to be fired it frees itself from both supports by moving forward under its own power. If the rockets are to be jettisoned, the front support is operated to release the pin 16 of the upper of the two super-imposed rockets and the rockets then pivot downwardly about the rear supports until they slide off the rear supports. The lower rocket of the pair is supported from the upper rocket by interengagement at 17 between the two sets of fins at the rear and by a second duplicate front band 13 the pin 16 of which engages a suitable aperture in the band 13 on the upper rocket. The rockets and their fins and bands are standard and interchangeable. Any desired number of pairs of rockets may be installed under each wing of an airplane, two pairs being shown in Figure 1. In practice, each rocket has a separate firing system accessible to the pilot or another member of the crew and the rockets may be fired either sequentially or in salvo, or jettisoned all together, or in pairs.

The front support referred to above comprises a pivoted post 18 which, in its operative position, extends downwardly at nearly right angles to the skin of the wing and folds back and up into a pocket 19 provided in the wing, the post being pressed on an axle 20 pivoted in bearings 21 in the wing, with torsion retraction springs 22 engaged between the axle and the wing structure.

This front post is arranged with a releasable socket jaw 23 to normally receive the pin 16 on the front band 13, a pair of levers 24 being pivoted at 25 and forming the socket jaws 23 therebetween below the pivot 25; while the upper ends 26 of the levers are normally held apart by a wedge 27 in turn held in place by an over-center positioned cam roller 28 mounted in a cam 29 rotatable on the axle 20. The socket jaws 23 may be opened to jettison the rocket by rotating the cam 29 counterclockwise in Figure 3 by means of a push rod 30 and bell crank 31 operated either manually or by a solenoid 32 as shown in Figure 9, thus allowing the wedge 27 to be lifted by a spring 33.

When firing of the rocket pulls the pin 16 forward out of the jaw socket, the spring 22 swings the post up into the wing pocket 19 and resiliently holds it flush therein. When it is desired to load another rocket, the post is manually pulled down and held in extended position by downward shifting of a manually operated downlock rod 34 having an upper pin 35 engageable with a lug 36 on the side of the wing pocket. The downlock rod 34 has an arm 37 at its lower end that extends across the opening 23 for the rocket pin 16, being so arranged that pushing the pin 16 into position lifts the rod 34 to release the downlock. The post then remains in its extended position because of the presence of the rocket but is ready to automatically retract upon firing or jettisoning of the rocket. A central pin 38 above the pivot 25 prevents either of the socket jaws 23 from projecting far enough to interfere with such retraction of the post when the jaws 23 have been opened by the jettisoning operation.

Duplicate rear posts 39 are similarly pivoted on axles 40 to retract sideways toward each other, torsion springs 41 being wound on the axles to accomplish this. The posts 39 carry pivoted pins 42 engageable in the fin sockets 14 and having a central insulated electrical contact 43, engaging the contact 15 in the fin, for firing the rockets. One fin contact 15 and its pin 42 is electrically connected by wiring 44 to the firing mechanism of the upper rocket and the other contact 15 and its pin 42 is connected by wiring 45 to the lower rocket, as schematically shown in Figure 8, to permit sequential firing at the will of the operator. The pins 42 are pivoted at 46 and have return springs 47 to permit the rockets to swing on the pivot 46 when the front posts 18 are released in the jettisoning operation, the rockets then swinging downwardly until pulled off the pins 42 by their own weight and the aerodynamic forces acting thereon. This arrangement prevents possible damage to the airplane structure if both the front and rear supports were released simultaneously when jettisoning an inert rocket.

The rear posts 39 are retracted sideways into pockets 48 in the wing skin, pivoting on the axles 40 under the influence of the spring 41. The rear posts are also provided with automatically released downlocks as best shown in Figure 6, where a downlock pin 50 can be moved to the right into a notch 51 in the wing skin by a lever 52 pivoted at 53 in the post and engaged at its lower end by a sliding member 54 carrying an external abutment 55 movable parallel to the rocket mounting pin 42, which is manually moved to the left to lock and is adapted to be pushed back into the position shown in Figure 6 upon mounting a rocket in position, thus retracting the downlock pin With this arrangement, as in the front post downlock previously described, the mounting of a rocket automatically releases the downlock so that the front and rear posts automatically retract flush with the wing skin upon firing or jettisoning of the rockets mounted thereon.

In the operation of loading the retractable posts, the front and rear posts are manually pulled down into position and temporarily locked in place; the front post 18 being locked in extended position by shifting the down lock rod 34 downwardly into the position of Figures 3 and 4, and the rear posts 39 by pulling the abutment 55 forward to shift the pin 50 rearward. A rocket 11, equipped with a mounting band 13 correctly spaced relative to its fins 12, is then lifted into position so that the band pin 16 enters the jaws 23 on the front post and the fin sockets 14 engage on the pins 42 of the rear posts 39. As the pin 16 approaches its proper position in the jaws 23 it releases the front post down-lock 34; and as the pins 42 bottom in the fin sockets 14 the fins push back the abutment 55 to release the down-locks 50 for the rear posts 39. If a second rocket is to be mounted, its fins are interlocked with the fins of the upper rocket and its band pin 16 engages the band pin of the first rocket.

When the rockets are fired their own energy pulls them forward out of engagement with the posts, which are then free to retract under the impulse of their retraction springs 22 and 41. Jettisoning an inert rocket involves release of the jaws 23 through energization of the solenoid 32, which pulls the cam 29 free of the wedge 27 and allows the spring 33 to lift the latter, whereupon the weight of the rocket opens the jaws 23 of the front post 18, allowing the rocket to swing down about the rear support pin pivots 46 until the rocket slides off the pins 42. The pins 42 are then swung back to the normal positions thereof by the springs 47 so that the rear posts can retract without interference from the pins 42.

While I have shown two superimposed rockets dependent from each set of posts, it will be understood that the posts are equally suitable for carrying other types of armament and/or containers to be dropped in flight, since the jettisoning arrangement will release such non-self-powered equipment.

It will be noted that the front post retracts fore and aft, and therefore is rigid sideways, forming a sway brace engaging the rocket at approximately its center of gravity. The twin rear posts retract sideways and are therefore rigid relative to the thrust or drag of the rocket and stabilize the latter against oscillations about its front support. The three posts thus form a three point mounting that eliminates the need of sway bracing or other auxiliary supporting or steadying arrangement, increasing the accuracy of aim.

Having thus described my invention and the present preferred embodiments thereof, I desire to emphasize the fact that many modifications may be resorted to in a manner limited only by a just interpretation of the following claims.

I claim as my invention:

1. Retractable supporting means for suspending rockets and the like beneath an airplane wing, comprising a front post pivoted to retract into a pocket flush with the surface of the wing when not in use, a pair of spaced rear posts also pivoted to retract into pockets flush with the surface of the wing, down-locks to retain said posts in extended position, means cooperating with said down-locks and arranged to contact a mounted rocket or the like whereby to release said down-locks upon mounting a rocket or the like on said posts and means for releasably suspending a rocket or the like from said posts.

2. Retractable supporting means for suspending rockets and the like beneath an airplane wing, comprising a front post pivoted to retract into a pocket flush with the surface of the wing when not in use, a pair of spaced rear posts also pivoted to retract into pockets flush with the surface of the wing, means for releasably suspending a rocket or the like from said posts, including means to release a rocket or the like from the front post for jettisoning the same, and means operable to retract said posts upon the release of a rocket or the like therefrom.

3. Retractable supporting means for suspending rockets and the like beneath an airplane wing, comprising a front post pivoted to retract into a pocket flush with the surface of the wing when not in use, a pair of spaced rear posts also pivoted to retract into pockets flush with the surface of the wing, down-locks to retain said posts in extended position, including means to release said down-locks upon mounting a rocket or the like on said posts, mounting means for releasably suspending a rocket or the like from said posts, including means to release a rocket or the like from the front post for jettisoning the same, and spring means to retract said posts upon the release of a rocket or the like therefrom.

4. Retractable supporting means for suspending rockets and the like beneath an airplane wing, comprising a front post pivoted to retract into a pocket flush with the surface of the wing when not in use, a pair of spaced rear posts also pivoted to retract into pockets flush with the surface of the wing, means for releasably suspending a rocket or the like from said posts, separate rocket jettisoning and firing means associated respectively with said front and rear posts, and means to retract said posts upon the release of a rocket or the like therefrom.

5. Retractable supporting means for suspending rockets and the like beneath an airplane wing, comprising a front post pivoted to retract into a pocket flush with the surface of the wing when not in use, a pair of spaced rear posts also pivoted to retract into pockets flush with the surface of the wing, means for releasably suspending a rocket or the like from said posts, comprising releasable pin engaging means associated with the front post and pivoted pins associated with the rear posts to respectively engage a pin and sockets carried by a rocket or the like, and means to retract said posts upon the release of a rocket or the like therefrom.

6. Retractable supporting means for suspending a disposable load beneath an airplane wing, comprising a front post pivoted at one end in the airplane and normally disposed flush with the surface thereof when not in use, a pair of spaced rear posts similarly pivoted for flush mounting in the wing, down-lock means for holding said posts extended preliminary to mounting a load thereon, and means so constructed and arranged as to sequentially release the load from the front and rear posts when the load is to be jettisoned in flight.

7. An arrangement as in claim 6 wherein the front post is pivoted on a transversely disposed axis to take side loads, and the rear posts are pivoted on longitudinal axes to take thrust loads.

8. An arrangement as in claim 6 wherein the sequential release is so arranged that the front post releases the load and the rear posts have pivotal supports for engaging the load which supports are arranged to allow the load to swing downwardly upon release of the front support until such downward movement pulls the load off the rear supports.

9. An arangement as in claim 6 wherein the down-lock means are provided with release means interfering with the load whereby application of the load releases the down-locks.

GEORGE J. KUKA.

REFERENCES CITED

The following references are of record in the file of this patent:

UNITED STATES PATENTS

| Number | Name | Date |
| --- | --- | --- |
| 1,166,488 | Smith | Jan. 4, 1916 |
| 1,485,775 | Fales | Mar. 4, 1924 |
| 2,409,210 | Jolly | Oct. 15, 1946 |
| 2,414,579 | Anderson et al. | Jan. 21, 1947 |
| 2,422,576 | Martin | June 17, 1947 |
| 2,427,885 | Turansky et al. | Sept. 23, 1947 |
| 2,481,542 | Schuyler | Sept. 13, 1949 |